United States Patent [19]
Mohajery et al.

[11] 4,018,980
[45] Apr. 19, 1977

[54] TRANSMISSION LINE SYSTEM HAVING IMPROVED STABILITY CHARACTERISTICS FROM WAKE-INDUCED SUBSPAN OSCILLATIONS

[75] Inventors: Mahmood Mohajery, Potsdam; Charles B. Rawlins, Massena, both of N.Y.

[73] Assignee: Aluminum Company of America, Alcoa Center, Pa.

[22] Filed: July 21, 1975

[21] Appl. No.: 597,665

[52] U.S. Cl. ............................................. 174/42
[51] Int. Cl.[2] ....................................... H02G 7/14
[58] Field of Search ...... 174/40 R, 42, 43, 128 BL, 174/146

[56] References Cited
UNITED STATES PATENTS 3,291,892  12/1966  Bethea, Jr. .................... 174/42

Primary Examiner—Laramie E. Askin
Attorney, Agent, or Firm—Teare, Teare & Sammon

[57] ABSTRACT

A transmisson line system having improved stability from wake-induced oscillations in a bundle of subconductors wherein longitudinally spaced transmission line towers support a span of subconductors therebetween, and the subconductors are connected in bundled relation by a plurality of spacer members disposed in longitudinally spaced relation along the length of the bundle defining adjacent subspans of distinctly different, predetermined length therebetween. More specifically, the spacer members define a minimum length subspan having a length determined on the basis of required torsional rigidity in the bundle, a maximum length subspan having a length determined on the basis of physical and electrical characteristics of the transmisson line to prevent "sticking" between adjacent subconductors and on the basis of atmospheric conditions to reduce the oscillation capabilities of the bundle, and an intermediate length subspan, as required by the overall length of the span, having a maximum difference in length with respect to the maximum length subspan consistent with minimizing the quantity of spacers used in the span. The spacer members are located away from a selected number of the nodes of the rigid body modes of the wake-induced oscillations of the subconductors which can possibly be excited by wind of a given velocity so as to dampen the oscillations and prevent damage to the system.

14 Claims, 6 Drawing Figures

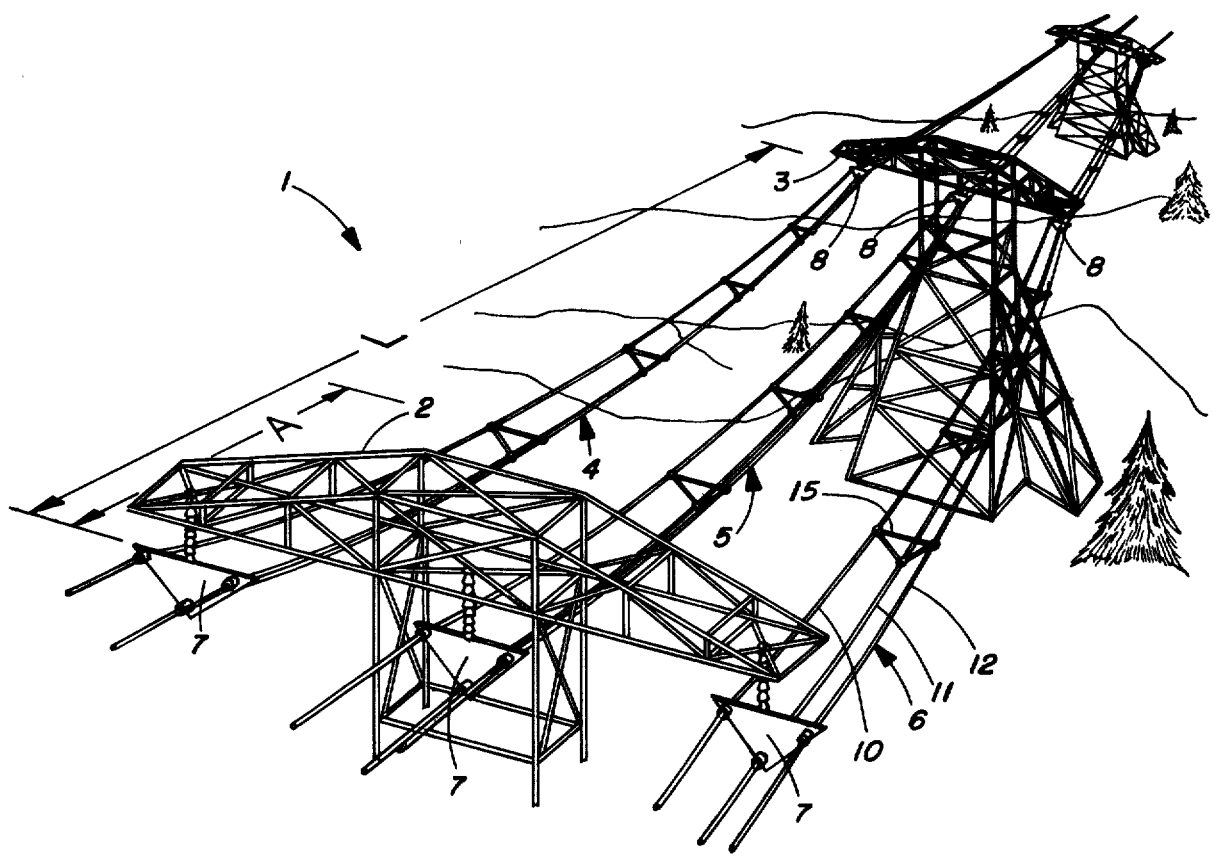
FIG. 1
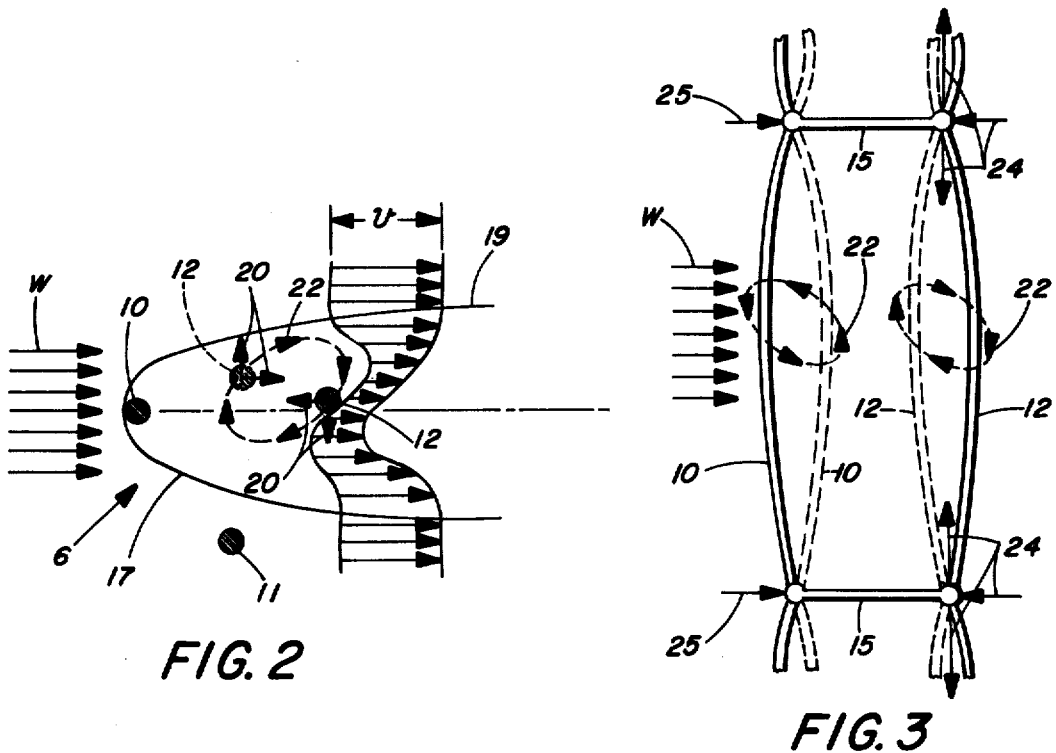
FIG. 2
FIG. 3

TRANSMISSION LINE SYSTEM HAVING IMPROVED STABILITY CHARACTERISTICS FROM WAKE-INDUCED SUBSPAN OSCILLATIONS

BACKGROUND OF THE INVENTION

The present invention relates to the spacing of bundled subconductors of a transmission line, and more particularly, to the control of wake-induced oscillations in the subconductors.

The conductors in transmission lines are subjected to different forms of oscillations which result from different conditions. For example, wake-induced oscillations in a subconductor are substantially different, both in nature and causes than other forms of vibrations, such as aeolian or vertical vibration, and thus require different arrangements for their suppression.

The aforementioned phenomena of wake-induced oscillations in bundled subconductors in transmission lines is a form of wind-induced flutter instability. For example, when wind blows across the bundle, the aerodynamic energy input to the leeward subconductor of the bundle disposed in the wake of the windward subconductor, causes instability and a consequent periodic motion of the leeward subconductor. The motion of the leeward subconductor is self-excited and comes about as the result of the variations in the drag and lift forces in the wake acting of the leeward subconductor. The motion of the leeward subconductor is transmitted to the windward subconductor through the mechanical coupling provided by spacer members connecting the subconductors together in the bundle, and thus, causes it to undergo similar periodic motion.

Several different modes of wake-induced instability can occur. These modes can be generally classified in two categories which are (1) the rigid body modes, and (2) the subspan modes. The rigid body modes are those where the bundle moves as a whole with no relative displacement amongst the points contained within a transverse cross-section of the bundle. On the other hand, the subspan modes are those where relative displacement occurs between the subconductors of the bundle contained in any vertical cross-section. It is known that several different rigid body modes, subspan modes, or combinations of these modes can actually occur in a span of bundled subconductors.

Wake-induced oscillation is relatively rare, but when this phenomena does occur and is allowed to go unchecked, transmission line failures can result. These failures usually occur in the support hardware and/or the spacer members connecting the subconductors, and in certain extreme cases can render the transmission line inoperative. As the subspan modes of the wake-induced instability condition are considered to cause a majority of these failures, the present invention is directed to a solution of the problems involved in the control and suppression of the oscillations resulting from the subspan modes to provide greater reliability in high-voltage power transmission lines.

SUMMARY OF THE INVENTION

The present invention contemplates solving the problems in regard to the control and suppression of wake-induced oscillations in the bundled subconductors of transmission lines. More particularly, in the present invention a plurality of transmission line towers support a span of bundled subconductors therebetween. The subconductors are connected together by a plurality of spacer members which are disposed in laterally-spaced relation along the length of the bundle defining adjacent subspans of distinctly different, predetermined length therebetween. The spacer members are located away from a selected number of the nodes of the rigid body modes of the wake-induced oscillations of the subconductors which can possibly be excited by wind of a given velocity. In addition, the spacer members are located such that the adjacent subspans are of lengths which have a maximum difference with respect to one another to provide optimum "detuning" between adjacent subconductors and use of spacer members throughout the span. More particularly, the subspans include a minimum length subspan having a length determined on the basis of a required torsional rigidity in the bundle such that the bundle will resume its original configuration should it be subjected to distortion, such as from unusual atmospheric conditions. In addition, a maximum length subspan is provided which has a length determined on the basis of physical and electrical characteristics of the transmission line to prevent sticking between adjacent subconductors, and also on the basis of atmospheric conditions, such as the usual wind velocity existing in the locality of the transmission line so as to reduce the oscillation capabilities of the subconductors. In certain circumstances, an intermediate length subspan may be required, depending upon the overall length of the span, having a maximum difference in length with respect to the maximum length subspan consistent with minimizing the quantity of spacers used in the span. Additional subintermediate length subspans may be required which have a length less than the aforementioned intermediate length subspans, which are subject to the same requirements as to maximum length difference between adjacent subspans and most economical use of spacer members.

By the foregoing arrangement, there is provided a transmission line system whereby a practical solution to the problems of wake-induced oscillations in bundled subconductors is achieved. More particularly, the arrangement disclosed enables the balancing of cost and a desired degree of protection to provide greater reliability in high-voltage power transmission lines.

BRIEF DESCRIPTION OF THE DRAWINGS

FIG. 1 is a panoramic view of a power transmission line having bundled subconductors;

FIG. 2 is a diagrammatic illustration showing the effect of the wake of a windward subconductor on the leeward subconductor of a bundle;

FIG. 3 is a diagrammatic illustration showing the interaction of mechanical forces between adjacent subconductors in a bundle.

DESCRIPTION OF THE PREFERRED EMBODIMENTS

Figure 4:
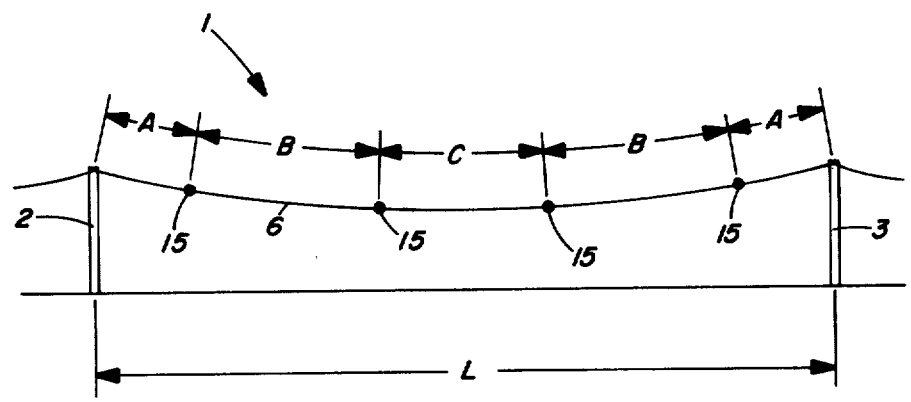
FIGS. 4, 5 and 6 are diagrammatic illustrations of different embodiments of the present invention.

In FIG. 1, a typical multi-phased transmission line 1 is shown which could embody the present invention, and includes longitudinally spaced towers 2 and 3 which support, such as between yoke plates 7 and 8, a span L of conductor bundles 4, 5 and 6 for each phase. Each bundle, such as 6, includes a plurality, such as three, of subconductors 10, 11 and 12, which are connected to one another by a plurality of spacer members 15. The spacer members 15 are disposed in longitudinally spaced relation along the subconductors and define subspans, such as A, therebetween. With such an arrangement, should the wind blow across the bundle at a given velocity, the various subconductors could become excited and begin oscillating in a periodic motion. The wind velocity at which these oscillations begin to occur is referred to as the "threshold velocity". Referring now also to FIGS. 2 and 3, when wind W blows across the respective bundles, such as 6, the windward subconductor 10 will cause a wake 17 across which the wind velocity V will vary from a maximum at the edge, such as at 19, to a minimum somewhere in the middle of the wake. If the winds reach the threshold velocity, the leeward subconductor, such as 12, in the path of the wake 17, will be subjected to varying lift and drag forces, such as indicated by the arrows at 20, within the wake which will cause periodic motion of the subconductor 12, as indicated by the arrows at 22. In turn, the periodic motion of the subconductor 12 will apply forces, such as indicated by the arrows at 24, on the connecting spacer members 15 which, in turn, will transmit these forces, such as indicated by the arrows 25, to the adjacent subconductor 10 to cause a similar periodic motion of the latter. In addition, the oscillations of one subspan of the subconductor 12 could cause oscillations of the adjacent subspan for reasons which will be discussed in more detail hereinafter. Thus, in the present invention, the spacer members 15 are located in predetermined spaced relation along the length of the respective bundles so as to suppress these oscillations in any subspan and to suppress interexcitation of adjacent subspans to prevent damage and possible interruption of power in the transmission line 1 while minimizing the number of the spacer members necessary to achieve this result.

Figure 5:
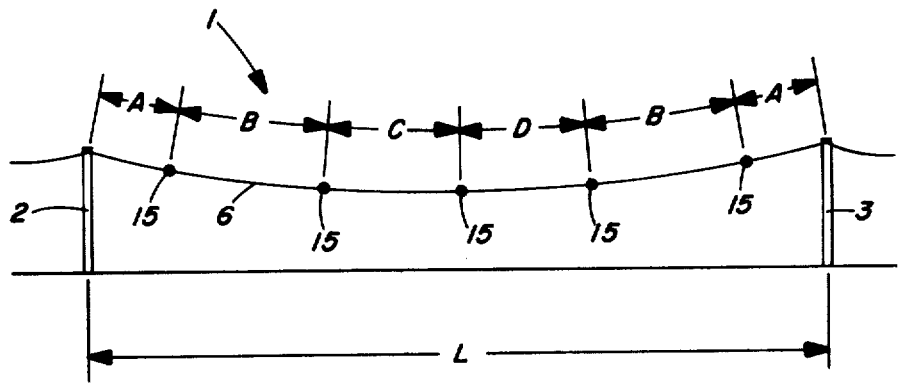

In FIG. 4, the transmission line 1 is shown diagrammatically embodying the present invention. More particularly, the bundle 6 extends between the towers 2 and 3 defining a span L. Spacer members 15 are disposed in laterally spaced relation along the bundle 6 and define a plurality of subspans of different length, such as a minimum length subspan A, a maximum length subspan B and an intermediate length subspan C. As shown, there is a minimum length subspan A disposed adjacent each of the towers 2 and 3, a maximum length subspan B disposed inwardly of and adjacent to each minimum length subspan A, and the intermediate length subspan C is disposed adjacent to the maximum length subspan B. The minimum length subspan A has a length which is the minimum for any subspan of the span L being based on the torsional rigidity required for the bundle to resume its normal orientation after being subjected to the unusual loading conditions resulting from atmospheric conditions in the locality of the transmission line. The maximum length subspan B has a length which is the maximum for any subspan of the span L, and is based on the physical and electrical characteristics of the transmission line, and the atmospheric conditions of the locality. Under certain circumstances, depending on the length of the span L, one (FIG. 4) or more (FIG. 6) intermediate subspans C may be required which would be disposed adjacent to and have a length which is less than the length of the maximum length subspan B, but greater than the minimum length subspan A. Preferably, the length of the intermediate length subspan C is a maximum difference with respect to the adjacent maximum length subspan B consistant with minimizing the number of spacers 15 required to provide satisfactory oscillation suppression for the transmission line 1. The maximum difference between the lengths of the adjacent subspans is desired to provide optimum detuning between adjacent subspans as will be discussed more fully hereinafter, to minimize the possibility of excitation of one subspan by an adjacent subspan. Referring to FIG. 5 an additional sub-intermediate length subspan D may be required having a length less than the intermediate length subspan C and disposed adjacent to the latter. The sub-intermediate length subspan D should have a length which maintains the desired maximum length difference with respect to the adjacent subspans, such as C or B, whereby optimum detuning is provided.

In the present invention, it is first necessary to determine the location of the nodes of a selected number of harmonics of the rigid body modes of the wake-induced oscillations before establishing the final length of any one of the afore-described subspans A, B, C or D. These harmonics and their nodal points can be theoretically calculated in a manner well known in the art. The actual number of harmonics to be considered is a direct function of the over-all span length, the severity of the atmospheric conditions, such as the magnitude of the wind velocity, the wind direction, the turbulence content of the wind and the like, which most frequently exist in the locality of the transmission line 1. For example, should meterological reports indicate that the wind in a particular locality very seldom or never exceeds a particular velocity, such as 30 MPH, then this value will be used to establish, theoretically, the number of harmonics of a span of a given length which will be excited. Generally, the number of harmonics considered increases directly with the wind velocity and the length of the span. More specifically, wind having a given velocity may excite the first ten harmonics of a subconductor in a span having a given length, whereas wind having twice that velocity will excite more harmonics in a span having the same length. Likewise, wind having a given velocity may excite the first ten harmonics of a subconductor in a span having one length and more harmonics in a subconductor in a span of greater length. Therefore, only the nodal points of those harmonics which will be excited will be taken into consideration when placement of the spacer members is made. It is to be understood that there will be certain atmospheric conditions which occur very rarely and for which conditions it is impossible, if not impractical, to provide adequate protection. In such instances, the protection of the transmission line becomes a practical matter, and the protection should be limited to less severe conditions which occur most frequently.

As previously stated, the minimum length subspan A has its length determined upon consideration of the torsional rigidity of the bundle, and may be calculated in a manner well known in the art. Preferably, the minimum length subspan A is disposed adjacent to the towers, such as 2 and 3, and has its length established for the reason that a bundle may from time to time become distorted or twisted as the result of certain atmospheric conditions. For example, excessive icing on the subconductors could cause the bundle to be rotated or twisted from its normal orientation, or sudden gusts of wind of extremely high velocity could also deform the bundle from its normal orientation. Therefore, the length of the minimum length subspan A is established so that the bundle will return to its original configuration after such unusual load conditions are removed. Although it may be necessary under certain conditions to specifically calculate the length of the minimum length subspan A, for most applications, a minimum length subspan A having a length in a range of approximately 50% to 60% of the length of the maximum length subspan B is considered to provide adequate torsional rigidity to a conductor bundle. A practical length for the minimum length subspan A would be in a range of approximately 90 to 160 feet. Of course, when certain severe atmospheric conditions are continually encountered, then the length of the minimum length subspan A would be decreased generally in proportion to any decrease in the length of the maximum length subspan B for reasons which will become more apparent hereinafter.

Generally, the determination of the length of the maximum length subspan B is made before the determination of the length of the minimum length subspan A. Primarily, the maximum length subspan B is limited in length by the physical and electrical characteristics of the transmission line which would cause sticking between adjacent subconductors, and by the desired threshold velocity for a particular conductor bundle. More particularly, it has been known in transmission line construction that spacer members connecting subconductors in conductor bundles should be laterally spaced within a maximum distance of one another in order to prevent sticking or coming together of the adjacent subconductors. For example, when a short circuit or fault current occurs in a transmission line, the adjacent subconductors forming the bundle may be subjected to a combination of forces which are eletromagnetic and elctrostatic in nature, and which can cause the adjacent subconductors to be drawn together, as aforesaid. Therefore, the maximum length subspan B is initially determined so as to prevent resticking of the subconductors after the short circuit or fault currents are removed. The calculations for determining the length of the maximum length subspan B to prevent sticking are well known in the art, and thus, will not be discussed in further detail herein. In any event, this calculated length for the maximum length subspan B should be considered the absolute longest length for normal atmospheric conditions, such as when the threshold velocity of the subconductors exceeds the normally expected wind velocities in the locality of the transmission line. On the other hand, if more severe atmospheric conditions are expected, such as winds which have a higher velocity than the threshold velocity of a maximum length subspan B having a length equal to or greater than the calculated longest length, higher protection levels will be required. Thus, the length of the maximum length subspan B must be reduced from the calculated longest length to a shorter actual length so that a higher threshold velocity is necessary to excite the subconductor. To determine this actual length, the threshold velocity is determined, such as from previous installations, theoretical calculations, or the like, for a maximum length subspan B having the calculated longest length. Then, as the threshold velocity of a given subspan is inversely proportional to its length, the actual length $L_2$ required for the desired protection can be determined by the following formula:

$$V_2 = V_1 \times (L_1/L_2);$$

where $V_1$ equals the threshold velocity of the calculated longest maximum length subspan B, $V_2$ is the established threshold velocity desired to provide the proper protection in a given locality, and $L_1$ is the calculated longest length for the maximum length subspan B. A practical upper limit for the length of the maximum length subspan B is considered to be approximately 250 feet, but can be reduced to a lower length, such as approximately 200 feet, if higher protection levels are required at the expense of providing a larger number of spacer members.

Generally, the over-all length of a given span, such as L, of a transmission line, such as 1, between its adjacent towers, such as 2 and 3, will be of a substantial length. Although the lengths of these spans can vary widely, it is not uncommon to find a considerable number of spans which have lengths that are in a range between approximately 1,000 and 2,000 feet. Therefore, it is readily apparent that it may be necessary to provide an additional intermediate length subspan C, such as shown in FIG. 4, in addition to the aforedescribed minimum length subspan A and maximum length subspan B in order to provide the desired protection over the entire length of the span L. It is in regard to the selection of the length of the intermediate length subspan C that the detuning between adjacent subspans has most significance, as the minimum length subspan A and the maximum length subspan B are determined by other factors related to the physical features of the transmission line and atmospheric conditions of the locality of the transmission line. The term "detuning" refers to the rendering of one subspan, such as B, incapable of exciting or starting oscillations in an adjacent subspan, such as A or C. More particularly, wind having one velocity which can excite and cause oscillations in a subspan of a given length cannot also excite oscillations in a subspan having a significantly different length, and, therefore, two adjacent subspans will not be simultaneously excited by the same wind, and the subspans adjacent to and excited subspan can help dissipate the energy input to the excited subspan. The detuning factor of adjacent subspans is the ratio of their length, and is preferably expressed by reference to the smallest length as compared to the largest length. That is, in a span having a minimum length subspan A of 100 feet, and an adjacent maximum length subspan B of 200 feet, the detuning factor between these subspans would be expressed as A/B or 100/200. Accordingly, in referring to the detuning factor between a maximum length subspan B and an intermediate length subspan C, the detuning factor would be C/B as C would be the smallest value in the ratio. Therefore, if the length of the maximum length subspan were 200 feet, and the length of the intermediate length subspan were 150 feet, then the detuning factor would be 150/200. As previously stated, in selecting the length of the intermediate length subspan C, it is preferred to keep the detuning factor as small as possible. For example, a detuning factor ratio of 1:1 is the worst possible condition, and most likely would provide minimal protection for the line against wake-induced oscillations. On the other hand, if the detuning factor is too small, then economical constraints become important considerations, as this could result in the use of too many spacer members. Therefore, it is desirable to find some intermediate detuning factor which, on the one hand, provides adequate protection, and on the other hand is economically practical in the use of spacer members. For example, a detuning factor in the range of 0.80 to 0.93 is considered to be effective in balancing the requirement for economy and distinctly different subspan lengths between adjacent subspans.

When, after the analysis of a span, it is found that adjacent subspans of more distinctly different lengths can be provided within the aforementioned range, it may be necessary to provide a subintermediate length subspan D. Thus, in determining the length of such subintermediate length subspan D, the same general considerations in regard to detuning and economic feasibility should be considered as were considered for the intermediate length subspan C.

As previously stated, the spacer members are to be positioned away from the previously calculated nodal points of the span. Therefore, the various lengths determined for the subspans should be adjusted so as to be increased or decreased, as required, to avoid placement of a spacer member at a nodal point.

The following charts show specific subspan lengths and sequences for spans of varying length. Chart I shows typical subspan lengths and sequences for selected span lengths where the initial selected length of the maximum length subspan B was 250 feet, whereas, in Chart II, the initial selected length of the maximum length subspan was 200 feet.

one of the spacer members at the location of one of the nodes of the rigid body nodes of the bundle of subconductors.

The embodiment of the present invention shown in FIG. 5 corresponds to Example 4 shown in Chart II. More particularly, five spacer members 15 are used in a span L of 1000 feet having a subspan sequence of A-B-C-D-B-A. In this particular example, the initial maximum length subspan B was 200 feet, but was increased to 212 feet after considering the other factors according to the present invention. The minimum length subspan A has a length of 126 feet and provides a detuning factor A/B of 0.594 with the maximum length subspan being 59.4% of the length of the latter. The intermediate length subspan C has a length of 177 feet, which when compared to the maximum length subspan B, provides a detuning factor C/B of 0.834. In this example, the subintermediate length subspan D has a length of 147 feet, providing a detuning factor D/C of 0.830 with the intermediate length subspan C, and a detuning factor D/B of 0.693 with the maximum length subspan B. As can be seen, the length of the maximum length subspan B is again increased slightly above the initially selected length of 200 feet to avoid placement

CHART I

| Example | Spacers | Span Length | Subspan Lengths | | | | | | | |
|---|---|---|---|---|---|---|---|---|---|---|
| 1 | 4 | 1000 | 135 | 260 | 211 | 260 | 134 | | | |
| 2 | 6 | 1500 | 147 | 261 | 211 | 261 | 211 | 261 | 148 | |
| 3 | 8 | 2000 | 153 | 262 | 215 | 262 | 215 | 262 | 215 | 262 | 154 |

CHART II

| Example | Spacers | Span Length | Subspan Lengths | | | | | | | | | |
|---|---|---|---|---|---|---|---|---|---|---|---|---|
| 4 | 5 | 1000 | 126 | 212 | 177 | 147 | 212 | 126 | | | | |
| 5 | 8 | 1500 | 110 | 197 | 164 | 197 | 164 | 197 | 164 | 197 | 110 | |
| 6 | 10 | 2000 | 116 | 212 | 177 | 212 | 177 | 212 | 177 | 212 | 177 | 212 | 116 |

The embodiment of the present invention shown in FIG. 4 corresponds to Example 1 of Chart I, which utilizes four spacers 15 in a span L of 1,000 feet, and an A-B-C-B-A subspan sequence. As shown, the span has a maximum length subspan B of 260 feet; a minimum length subspan A of 134 feet, and an intermediate length subspan C of 211 feet. In the spacer distribution shown, the minimum length subspan A is positioned adjacent to the towers 2 and 3, and the maximum length subspan B is disposed adjacent to the minimum length subspan A. In this particular example, the minimum length subspan A and the maximum length subspan B provide a detuning factor A/B of 0.519, which also falls into the desired range for adequate torsional rigidity, as previously set forth, with the length of the minimum length subspan A being 51.9% of the length of the maximum length subspan B. Because of the length of the span L, an intermediate length subspan C has been selected having a length of 211 feet providing a detuning factor C/B of 0.81. As can be seen, the maximum length subspan B was increased to a length above the initially established 250-foot length so that maximum detuning is provided and the least number of spacer members are used while maintaining the detuning factors within the preferred ranges previously set forth. More importantly, use of the 250-foot maximum length subspan would have resulted in the placement of a spacer member at a node and so that the desired proportions between adjacent subspans could be maintained, and a minimum number of spacers would be provided over the length of the span L.

Figure 6:
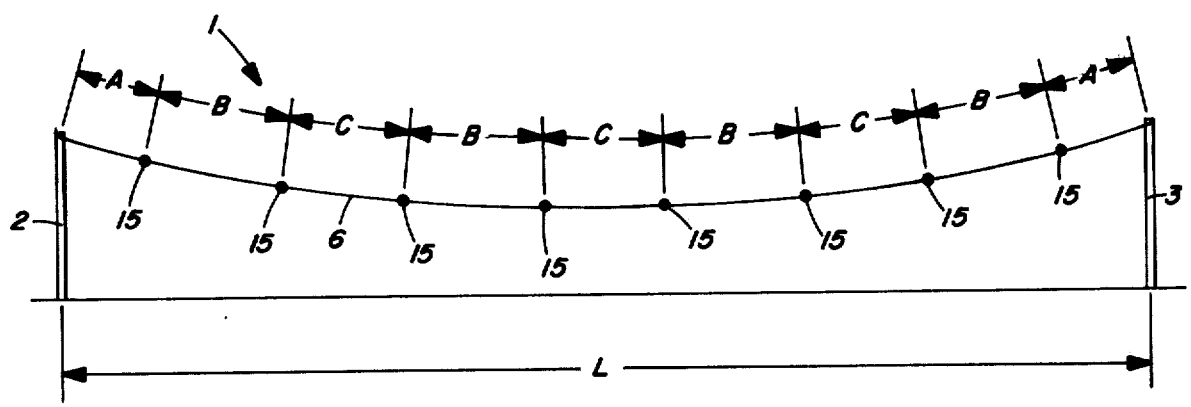

In FIG. 6, Example 5 of Chart II is shown diagrammatically where eight spacer members 15 are employed in a span L having a length of 1,500 feet and an A-B-C-B-C-B-C-B-A subspan sequence. In this example, the initially selected length of the maximum length subspan B was 200 feet, but was reduced below this length to attain the proper spacer member distribution according to the present invention. As shown, the minimum length subspan A has a length of 110 feet, being 55.8% of the length of the maximum length subspan B, providing a detuning factor A/B of 0.558. The intermediate length subspan C has a length of 164 feet, providing a detuning factor C/B of 0.832. As can be seen, this example does not include a subintermediate length subspan D, but rather the C/B detuning factor is repeated throughout the length of the span L.

It is to be understood that any reference to spacer members in the foregoing description is intended to include those having damping characteristics, as well as those that do not. It should be further understood that minor variations may be made in regard to the ranges and proportions set forth herein without departing from the spirit and scope of the invention. The arrangement set forth provides a practical solution to the problems associated with wake-induced oscillations being concerned with providing the desired level of protection to a transmission line in the most efficient and economical manner.

We claim:

1. A transmission line system having improved stability characteristics from wake induced subspan oscillations, such system comprising, a plurality of transmission line towers spaced apart and supporting at least one conductor bundle extending therebetween, each of said bundles including at least two subconductors with each bundle length defining a span between adjacent pairs of said towers, a plurality of spacer members disposed in longitudinally spaced relation along said bundle and connecting said subconductors together and defining subspans therebetween, each span having at least two such subspans and each of said subspans having a predetermined length different from the length of an adjacent subspan, and at least one of said spans having a structure so as to provide a plurality of longitudinally spaced nodes of the harmonics of the rigid body modes of wake induced oscillations of said span upon wind of a given velocity being applied to said span, said spacer members being attached at locations along the length of an associated bundle and being disposed longitudinally away from the nodes of a selected number of the said harmonics of such rigid body modes produced from the wake-induced oscillations of the subconductors within said bundle which are present in said span in response to said given wind velocity in the attached condition of said spacer members.

2. A transmission line system in accordance with claim 1, wherein said subspans include a maximum length subspan having a given longest length.

3. A transmission line system in accordance with claim 2, including a minimum length subspan having a length less than the length of said maximum length subspan.

4. A transmission line system in accordance with claim 3, wherein said minimum length subspan has a length in a range of approximately 50% to 60% of the length of said maximum length subspan.

5. A transmission line system in accordance with claim 3, wherein each minimum length subspan of said span is disposed adjacent to one of said towers.

6. A transmission line system in accordance with claim 3, including an intermediate length subspan disposed adjacent to said maximum length subspan and having a length less than said maximum length subspan and greater than said minimum length subspan.

7. A transmission line system in accordance with claim 6, wherein said intermediate length subspan provides a length ratio detuning factor within a range of approximately 0.80 to 0.93 with respect to said maximum length subspan.

8. A transmission line system in accordance with claim 6, including a subintermediate length subspan disposed adjacent to said intermediate length subspan having a length less than said intermediate length subspan and greater than said minimum length subspan.

9. A transmission line system in accordance with claim 8, wherein said subintermediate length subspan provides a length ratio detuning factor in a range of approximately 0.60 to 0.93 with respect to its adjacent subspan.

10. A transmission line system in accordance with claim 6, wherein additional maximum length subspans and intermediate length subspans are alternated within the spans.

11. A transmission line system in accordance with claim 2, wherein said maximum length subspan has a shorter actual length from said given longest length.

12. A transmission line system in accordance with claim 1, wherein each of said subspans provide a length ratio detuning factor equal to or less than approximately 0.93 with respect to an adjacent subspan.

13. A transmission line system in accordance with claim 1, wherein said subspans include a pair of minimum length subspans of approximately equal length disposed adjacent to said towers and a pair of maximum length subspans of approximately equal length disposed adjacent to at lease one minimum length subspan, and each maximum length subspan having a relatively larger length than each minimum length subspan.

14. A transmission line system in accordance with claim 13, including an intermediate length subspan having a length greater than said minimum length subspan and less than said maximum length subspan being disposed between said pair of maximum length subspans and providing a length ratio detuning factor equal to or less than approximately 0.93 with respect to the adjacent maximum length subspans.

* * * * *